No. 794,737. PATENTED JULY 18, 1905.
J. A. PEER.
MITERING MACHINE.
APPLICATION FILED AUG. 29, 1904.
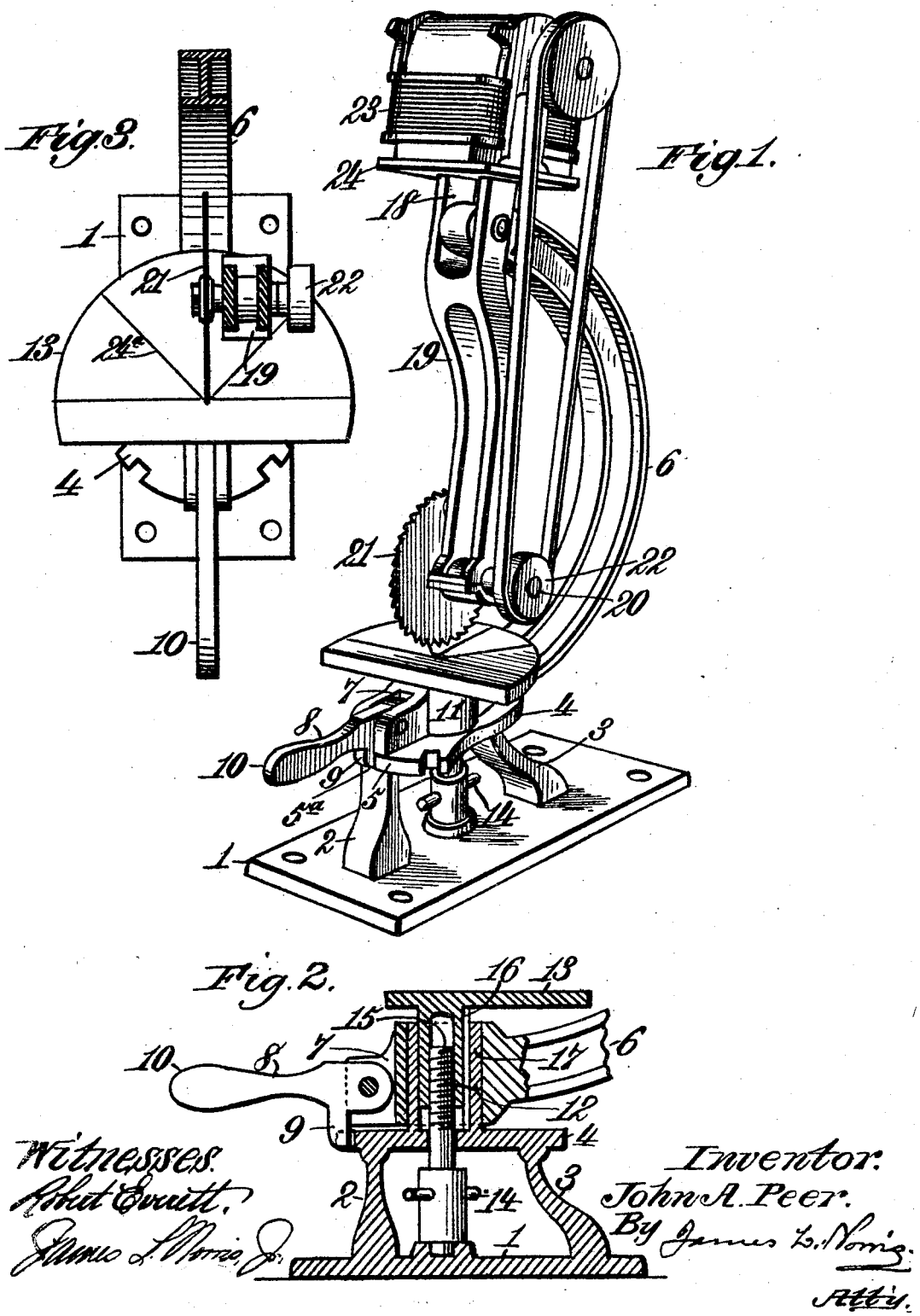
Witnesses.
Robt Everitt
James L. Norris Jr.
Inventor:
John A. Peer.
By James L. Norris
Atty.

No. 794,737.

Patented July 18, 1905.

UNITED STATES PATENT OFFICE.

JOHN A. PEER, OF BLOOMINGTON, ILLINOIS.

MITERING-MACHINE.

SPECIFICATION forming part of Letters Patent No. 794,737, dated July 18, 1905.

Application filed August 29, 1904. Serial No. 222,638.

*To all whom it may concern:*

Be it known that I, JOHN A. PEER, a citizen of the United States, residing at Bloomington, in the county of McLean and State of Illinois, have invented new and useful Improvements in Mitering-Machines, of which the following is a specification.

This invention relates to mitering-machines for making picture and other frames and the like or for use in executing diagonal or bevel crosscut-work and embodies an organization of elements insuring cleanness in the cutting and accuracy in the matching of the mitered parts at whatever angles and dispenses with the necessity for the use of a plane or chisel to complete or perfect the joint.

The present mitering-machine is of a portable nature and carries therewith the motive power for operating the cutting means, which in the present instance is a saw held by a swinging arm, the latter and the motive means being supported from the upper extremity of a gooseneck or the like. The cutter or saw coöperates with a stationary table and is adjustable, together with the arm carrying the same and the gooseneck, to vary the angular positions with respect to such table. The table is also preferably adjustable in a vertical direction to compensate for depth of cut or thickness of material operated upon, and, furthermore, the cutter or saw is manually movable to effect a perfect cutting action by the operator over the table. In other words, all the parts of the machine aside from the table are laterally movable in opposite directions through the medium of suitable devices and connections to arrive at the angle of cut or bevel desired while the work is held in a positive position on the table.

In the drawings, Figure 1 is a perspective view of a machine embodying the features of the invention. Fig. 2 is a transverse vertical section through a part of the machine, particularly showing the vertical adjusting means for the table. Fig. 3 is a horizontal section taken through the plane of the cutter or saw holding arm above the table.

Similar numerals of reference are employed to indicate corresponding parts in the several views.

The numeral 1 designates a base which may be temporarily fixed to a support and has front and rear standards 2 and 3 rising therefrom and connected to a substantially segmental bed 4, the front edge 5 of which is in the true arc of a circle and has a central recess $5^a$. The lower end of a gooseneck or carrier 6 is rotatably held on the bed 4, the upper end of said gooseneck rising a suitable distance above the plane of the bed. The terminal of the lower end of the carrier or gooseneck 6 is longitudinally slotted, as at 7, and pivotally mounted therein is a locking-lever 8, formed with a depending shouldered catch 9 and a handle or grip 10, the catch 9 being adapted to engage the recess $5^a$ or either terminal of the front arcuate edge 5 of the bed 4. The lower end of the carrier or gooseneck 6 in rear of the slot 7 is enlarged, as at 11, and centrally extending therethrough is a post 12, which serves as a pivot or fulcrum means for the said lower end of the carrier and a positive support for a semicircular table 13, the lower end of the post being secured to the base 1. The lower end of the post 12 is preferably swiveled to the base, as shown, and has a cross rod or bar 14, forming a part thereof or secured thereto, for rotating the post to elevate or depress the table 13. The post comprises a screw-threaded stem 15, to which the rod or bar 14 is attached, the screw-threaded portion of the said post projecting upwardly through the bed and engaging an interiorly-screw-threaded sleeve 16, depending from the table 13 and movable in a tubular guide 17, or the said post may be employed independently of the tubular guide and work directly in the bed, the sleeve 17 depending from the latter and being the preferred construction to obtain a vertical adjustment of the table. The upper end of the gooseneck or carrier 6 projects through a slot 18 in the upper end of a cutter or saw carrying arm 19, the latter having its major portion projected laterally, or in the present instance to the right, and provided with a mandrel or spindle 20, on which a saw 21 is secured. The saw 21 is held on the inner end of the spindle 20, and on the outer end of the latter is a grooved pulley or analogous device 22, which is belted or otherwise operatively connected to a motor 23, firmly held on a cap-plate 24, secured to the upper end of the arm 19 above the plane of the upper terminal of the carrier or gooseneck 7, to which the said arm is pivoted. The top of the table is also preferably divided or has disclosed thereon marks or slots 24ª, indicating varying angles of cut within an area of one hundred and eighty degrees, and as many of these indicating means may be used as found necessary and desirable to render the machine effective in performing various kinds of work. The arm 19 and the motor carried thereby are free to swing on the upper end of the carrier or gooseneck 6, and as the distance between the grooved pulley 22 and the motor-shaft or the belting device on the latter always remains constant the driving power or actuation of the cutter or saw spindle or shaft will always remain the same.

The motor for the operation of the machine is not confined to any particular construction and may be either electric, water, fluid, or any other type. Furthermore, the proportions of the machine may be modified to accommodate the same to various kinds of work; but under ordinary conditions the cutter or saw will be large enough diametrically to have extended range of operation with respect to various dimensions of molding or other material.

In the operation of the machine the work is disposed on the table 13 and may be held by hand or any other suitable means, the carrier or gooseneck 6 being set at the desired angle with respect to a table and the angle of miter or bevel desired to be cut. The arm 19 is then drawn forwardly over the work until a practical separation ensues, and owing to the arc through which the saw or cutter travels a portion of the work will not be completely severed. This is advantageous in treating or cutting certain materials to avoid flying off of the pieces and injury to the surface ornamentation or gilding, a complete separation being afterward obtained by means of a hand or miter saw.

The work of forming miter-joints or bevels or cutting strips in diagonal planes can be carried on expeditiously by the improved machine set forth, and it will be understood that the arm carrying the cutter or saw may be quickly operated without inconvenience to bring the cutter in operative engagement with the work owing to the curvature of the carrier or gooseneck and the free dependence of the arm 19 over the table 13 and the capability of swinging said arm backwardly to clear the table.

Other advantages will become apparent to those using the machine.

Materials in the construction of the several parts of the machine may be varied; but it is preferred to use metal in view of superiority of such material from a standpoint of durability and strength.

Having thus fully described the invention, what is claimed as new is—

1. In a mitering-machine, the combination with a table, having a curved rear edge, a carrier having a vertical pivot well forward under the table, said carrier extending rearwardly and up behind the curved edge of the table and then forward thereover, and capable of swinging around said edge, and a single depending arm pivoted to the carrier substantially over said pivot of the latter to swing in a vertical plane, the arm having a cutting device at its lower extremity.

2. In a machine of the class set forth, a work-supporting table, a carrier in rear of the table and adjustable in opposite lateral directions at varying angles with respect to the table, the carrier projecting above the plane of the table, and a swinging arm pivotally attached to the upper end of the carrier and depending over the table and having a motor disposed on the upper end thereof above the pivotal point therefor, and a cutter at its lower extremity connected to the motor.

3. In a machine of the class set forth, the combination of a vertically-adjustable work-supporting table held fixed as to movement in opposite vertical directions in a horizontal plane and having a curved rear edge, a bed on which said table is mounted, a carrier having a vertical pivot well forward under the table, said carrier extending rearwardly and up behind the curved edge of the table and then forwardly thereover and capable of laterally swinging around the said edge, a depending forwardly and rearwardly swinging arm held by the upper extremity of the carrier and pivoted to the latter substantially over the pivot of the carrier to swing in a vertical plane, a cutting device rotatably carried by the lower extremity of the arm, and means on the upper extremity of the arm for actuating the cutting device.

4. In a machine of the class set forth, the combination of a base supporting a bed, a vertically-adjustable post extending upwardly from the base through the bed and having a work-table supported on its upper terminal, a carrier adjustably mounted on the bed, the post extending through the said carrier, means for locking the carrier in adjusted position, and a swinging arm pivotally connected to the upper end of the carrier and having a cutter in its lower extremity operatively disposed over the work-table.

5. In a machine of the class set forth, the combination of a bed, a work-table vertically adjustable with respect to and held on the bed, a laterally-adjustable carrier having its lower end movably held on the bed and projecting upwardly in rear of the work-table and adjustable independently of the latter, and a forwardly and rearwardly swinging arm held by the upper extremity of the carrier and provided with a cutter at its lower extremity movable over the work-table, the lower end of the carrier movably held on the bed having the support for the table extending therethrough.

6. In a machine of the class set forth, the combination of a work-holding table, a carrier projecting upwardly in rear of the table and adjustable in opposite lateral directions at varying angles with respect to the table, and a swinging arm attached to the upper extremity of the carrier and having a cutter in its lower extremity movable over the table, and a motor on its upper extremity above the point of attachment thereof to the carrier, the motor being connected to the cutter.

7. In a machine of the class set forth, the combination of a work-holding table, a carrier in rear of and rising above the table and adjustable in opposite lateral directions at varying angles with respect to the table, a swinging arm attached at its upper extremity to the upper end of the carrier and having a cutter rotatably mounted in its lower extremity, a motor held on the upper end of the arm above its point of attachment to the carrier, and a movable connection between the said motor and the cutter.

In testimony whereof I have hereunto set my hand in presence of two subscribing witnesses.

JOHN A. PEER.

Witnesses:
SIGMUND LIVINGSTON,
WILLIAM R. BACH.